(No Model.) 3 Sheets—Sheet 1.

I. C. SCHUYLER.
COOKING STOVE OR RANGE.

No. 386,610. Patented July 24, 1888.

Fig. 1.

Fig. 3.

WITNESSES:
George Binkenburg
E. M. Clark

INVENTOR:
I. C. Schuyler
BY Munn & Co
ATTORNEYS.

(No Model.) 3 Sheets—Sheet 2.

I. C. SCHUYLER.
COOKING STOVE OR RANGE.

No. 386,610. Patented July 24, 1888.

WITNESSES:
George Buckenburg.
E. M. Clark.

INVENTOR:
I. C. Schuyler
BY Munn & Co.
ATTORNEYS.

(No Model.) 3 Sheets—Sheet 3.
I. C. SCHUYLER.
COOKING STOVE OR RANGE.
No. 386,610. Patented July 24, 1888.
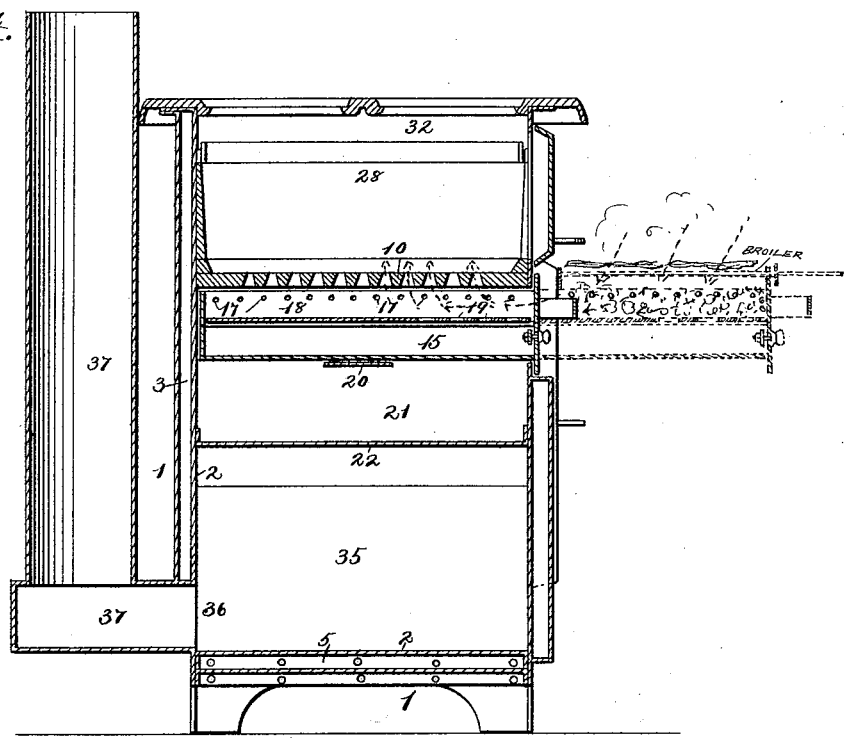
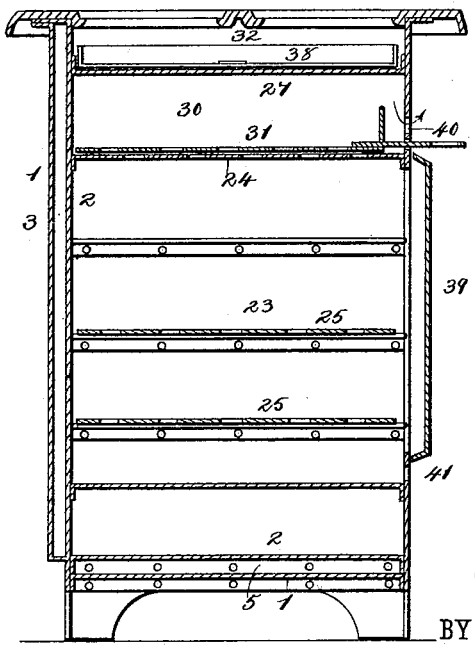
WITNESSES:
George Binkenburg
E. M. Clark
INVENTOR:
I. C. Schuyler
BY Munn & Co
ATTORNEYS.

United States Patent Office.

ISAAC C. SCHUYLER, OF FALLS CITY, NEBRASKA.

COOKING STOVE OR RANGE.

SPECIFICATION forming part of Letters Patent No. 386,610, dated July 24, 1888.

Application filed July 27, 1887. Serial No. 245,437. (No model.)

*To all whom it may concern:*

Be it known that I, ISAAC CLEMENS SCHUYLER, of Falls City, in the county of Richardson and State of Nebraska, have invented a new and useful Improvement in Cooking Stoves or Ranges, of which the following is a full, clear, and exact description.

My invention relates to an improvement in cooking stoves or ranges, and has for its object to provide a stove that will not only save a large percentage of fuel, but which will also add to the comfort in cooking by preventing as much as possible the radiation of heat into the room, and to utilize all possible surplus heat usually passed up the chimney to raise the temperature of the draft before it enters the combustion-chamber, whereby less fuel will be used to raise the air-supply to the required temperature for consumption.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the figures.

Figure 2:
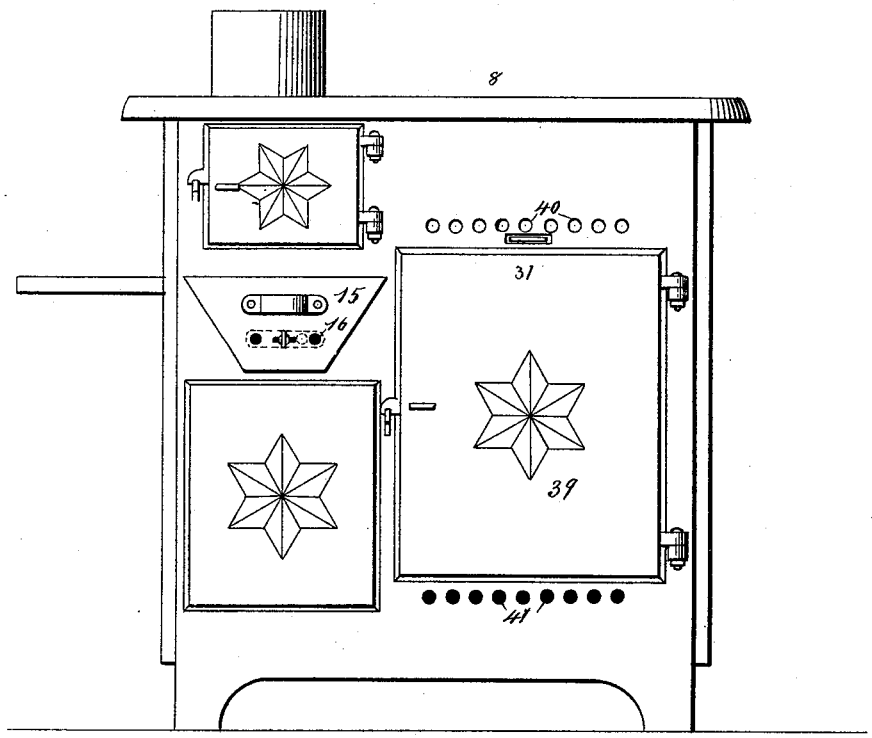
Figure 6:
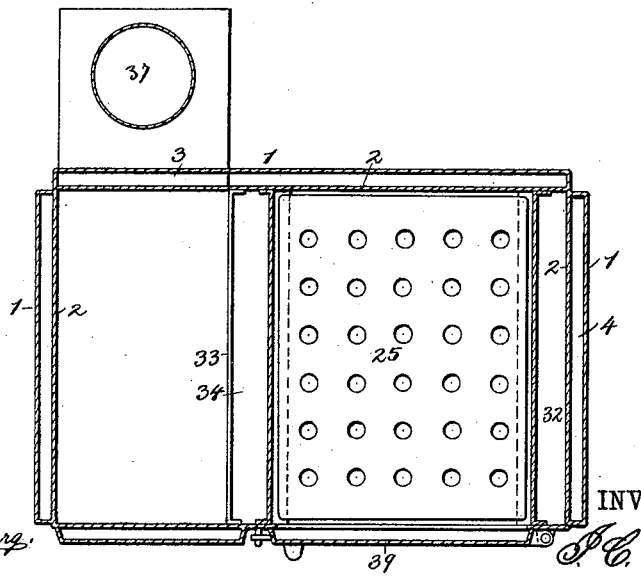

Figure 1 is a plan view of the range partially broken away. Fig. 2 is a front elevation thereof. Fig. 3 is a longitudinal vertical section on line $x\ x$ of Fig. 1. Fig. 4 is a transverse vertical section on line $y\ y$ of Fig. 1. Fig. 5 is a transverse vertical section on line $z\ z$ of Fig. 3, and Fig. 6 is a horizontal section taken on line $w\ w$ of Fig. 3.

In the construction of the range the top, griddles, the grate and lining, and the doors and legs are to be made of cast-iron, the body preferably of about No. 14 flange-iron, and the oven and hot-air chamber plates of a low grade of sheet metal, as thin as consistent with durability in order to transmit as much heat as possible.

At both ends and at the back of the range a double wall, 1 and 2, is provided, and likewise at the bottom, whereby four independent air-spaces, 3, 4, 5, and 6, are obtained, the spaces 3, 4, and 5 being purposed to prevent a great radiation of heat in the room, and the space 6, while serving the same purpose, also acts in the capacity of an air-flue, being provided at the base transversely with a series of perforations, 7, in the outer wall of the range, through which air is admitted.

The top 8 of the range is constructed in substantially the usual manner, and may be provided with any suitable number of griddles 9.

The grate 10 is supported in any approved manner transversely at the left of the stove, as seen in the drawings near the top, and may be made stationary or to dump. Between the inner wall, 2, however, and the side of the grate a space, 11, is provided, and likewise between the lining 12 upon that side and the inner wall, the said lining being made to rest against the wall 2 at the top with an air-tight joint and to unite with the grate by a similar joint, as seen in Fig. 3. In the wall 2, at the top, a series of apertures, 13, are produced, whereby the cold air entering the flue 6 is allowed to pass into the passage 11 and in contact with the outer face of the lining 12.

The grate 10 is cast with longitudinal flanges 14, between which flanges a triangular ash-pan, 15, is slid, being entered through a similarly-shaped aperture in the front of the stove, as seen in Fig. 2.

The front of the ash-pan is provided with a draft-slide, 16, near the bottom, and longitudinally the upper edge of the said pan, inside the stove, upon both sides, a series of apertures, 17, are made, as shown in Figs. 3 and 4. Longitudinally within the ash-pan, slightly below the line of apertures 17, a horizontal partition, 18, is detachably supported, having the surface thereof from the front end nearly to the center perforated, as shown at 19, Fig. 4, the object being to place a bed of coals upon the perforated portion of the partition to broil meat. At such time only is the slide 16 opened.

When it is desired to broil, the ash-pan will be drawn out to the position shown in dotted lines, Fig. 4, and its slide 16 opened and the partition 18 put in position. A bed of live coals will now be placed upon the perforated portion of the partition 18, when any suitable broiler may be used over the coals. The draft is indicated by dotted arrows.

The ash-pan is supported centrally in position by a bar, 20, Fig. 4, upon which it slides. It will be observed that the flanges upon the grate act as a seal and prevent any air entering through the flue 6 passing over the top of the ash-pan, and that said air must therefore pass through the apertures 17.

Below the ash-pan a sufficient distance to admit of a good-sized chamber, 21, being formed a triangular or trough shaped partition, 22, is attached to the inner wall, 2, at one side and to the side plate of the oven 23 at the other, the ends of said partition being respectively secured to the front and back of the range by rivets or otherwise. The chamber 21 thus formed is adapted to receive the partially-heated air from the passage 11, which leads into the same.

The oven 23 extends vertically from a point one side the grate down near the bottom of the range, as shown in Fig. 3, and horizontally to the right, as shown in the same figure, near the inner wall, 2, at that end, being held in position by attachment at front and rear to the inner walls of the range.

The oven 23 is provided with a perforated top, 24, and a series of perforated removable slides, 25, and a space, 26, is left between the wall of the oven at the top and the grate. Upon the top of the oven, the length and breadth thereof, a casing, 27, is built, the side toward the fire, however, having an inclination corresponding to the inclination of the rear side lining, 28, in which side inclined wall near the top a series of apertures, 29, are provided.

By means of the aforesaid casing a chamber, 30, is produced, designed to be a hot-air chamber, and within said chamber, at the bottom, a damper, 31, is made to slide upon the apertured top of the oven, the said damper being slightly less in length than the depth of the oven and similarly apertured as the top thereof. Thus to open the damper it is pushed in, which carries the perforations in the same out of registry with the perforations in the oven. When, however, the damper is closed or pulled out, the said perforations register, as shown in Fig. 3. The rear side lining, 28, which forms a seal with the grate, also forms a seal with the top of the casing 27, a space being made to intervene said lining, and the inclined side of the oven forming the complete passage 26, which connects the hot-air chamber 30 with the hot-air chamber 21.

Between the top of the casing 27 and the top of the stove a flue, 32, is formed, which flue extends down between the side of the oven and the inner wall of the range and between the bottom of the oven and the bottom of the range, as shown in Fig. 3.

At the end of the flue 32, below the partition 22, and at one side of the oven, a vertical baffle-plate, 33, is secured to the bottom of the range, a passage-way, 34, being made to intervene the said baffle-plate and the oven.

Within the chamber 35, beneath the partition 22, adapted to receive the waste products of combustion level with the floor of the range, an opening, 36, is made in the rear wall, leading into a take-off flue, 37. (Shown in Figs. 3 and 4.) At the intersection of the upper horizontal and the vertical portions of the flue 32 a damper, 38, is provided, adapted to slide upon the casing 27, and when drawn out to separate the aforesaid portions of the flue 32, and by stopping the circulation of the products of combustion through the said flue and out through the take-off cool the fire.

Above and below the oven-door 39 a series of apertures, 40 and 41, are made, the former admitting air to the chamber 30 and the latter admitting air at the bottom of the oven.

In operation the hot air and products of combustion from the fire pass over the chamber 30, drawn through the single flue 32, up the flue 34, against the triangular trough-shaped partition 22, heating the chamber 21, the colder portion settling down and escaping through the take-off flue 35, as shown in Fig. 3. The cold air entering the apertures 7 passes up the space 6, through the apertures 13, down the passage 11, between the fire-brick and the outer side of the stove, and into the chamber 21, becoming heated by contact with the fire-brick, and again heated in chamber 21 by the products of combustion aforesaid. The hot air passes up from the chamber 21 through the apertures in the ash-receptacle to the grate. The area of the apertures 7 are only sufficient to supply a small portion of air for combustion, the major portion of cold air to support combustion being entered at 40 and 41, and is regulated by the manipulation of damper 31. For instance, when the damper 31 is manipulated to throw the apertures of the oven and damper out of registry, the cold air passing in through the apertures 40 is heated in chamber 30, and from there passes through the apertures 29, into the passage 26, being again heated, down into the chamber 21, and from thence to the grate. When the apertures in the damper 31 are brought into registry with the apertures in the oven, the greater portion of the air for combustion enters the apertures 41, receiving the full heating capacity of the oven, from whence it passes into chamber 30, and from there to the grate, as aforesaid, the cold air being drawn up to the grate in all cases by the draft of flue 37.

The oven is heated mainly by the products of combustion transmitted through the flues 32 and 34, and when the oven is to be used for baking the damper is manipulated to bring the apertures therein out of registry with the apertures in the oven, thereby retaining all heat in the oven. If desirable, the apertures 41 may be provided with a slide to regulate the cold air entering the oven. When baking, the air for combustion enters through the apertures 40 and 7. In the event the fire is too fierce the damper 31 (shown in Fig. 3) is shut over the flue 32.

Having thus described my invention, what I claim as new, and desire to secure by Letters Patent, is—

1. A stove provided with a fire-pot consisting of a grate recessed at the top to receive the linings and an air-space intervening one side lining and the end of the stove and the opposite side lining and the oven, both of the side flues leading to the ash-pit and receiving air through apertures at their upper ends, substantially as shown and described, whereby the air in said space is heated and the linings protected from burning, as set forth.

2. A stove provided with an oven having a perforated top, a hot-air chamber above said oven, and a damper sliding in said hot-air chamber, perforated to register with the perforations in the oven-top, and a flue leading from said chamber to the fire-pot, substantially as shown and described, whereby the air is allowed to pass from said oven into said chamber, as set forth.

3. A stove having a chamber beneath the fire-pot and separated therefrom by a partition, a combustion-flue passing around the oven and entering said chamber near the top, and an exit-flue near the bottom of said chamber, substantially as shown and described.

4. The combination, with a stove, of a detachable ash-receptacle provided with a detachable longitudinal partially-perforated plate held above the bottom in its forward end, substantially as shown and described, whereby hot coals may be placed upon the plate when the receptacle is drawn outward, and meats broiled thereon, the draft being through the coals and rearward under the grate, as set forth.

5. The combination, with a stove, of a detachable ash-receptacle provided with a detachable longitudinal partially-perforated plate held above the bottom, a draft-opening in the end of said receptacle below the plate, and a series of longitudinally-arranged apertures above the plate in each side, substantially as shown and described, whereby hot coals may be placed upon the perforations of the plate, meat broiled thereon, and the fumes carried up into the fire, as set forth.

6. The combination of a stove provided with a fire-pot at one end, an outer jacket, 1, covering said end, whereby an air-space, 6, is formed, a series of inlet-apertures, 7, in the base of said jacket, a passage, 11, intervening the inner wall, 2, of said space 6 and the lining 12 of the fire-box and leading to the fire-pot through the ash-pit, and a series of outlet-apertures, 13, connecting said space 6 and passage 11, substantially as shown and described, whereby the air is heated and passed up into the fire, as set forth.

7. The combination, with a stove provided with a fire-pot at one end and an outer jacket, 1, covering said end, whereby an air-space, 6, is formed, a series of inlet-apertures, 7, in the base of said jacket, a passage, 11, intervening the inner wall, 2, of said space 6 and the lining 12 of the fire-box, and a series of outlet-apertures, 13, connecting said space 6 and passage 11, of a trough-shaped partition, 22, supported below the fire-box and passage, whereby hot-air chamber 21 is formed, the hot-air chamber 35 below said partition, and the combustion flue 32, leading from the fire-pot around the oven into said chamber 35 and through an exit therein, whereby the air in space 6 and chamber 21 will be heated by the products of combustion, substantially as shown and described, and for the purpose herein set forth.

8. The combination, with a stove provided with an air-space, 6, air-inlet aperture 7, and air-outlet apertures 13, a passage, 11, intervening the inner wall of said air-space and the fire-box lining, a trough-shaped partition beneath the fire-box, whereby a chamber, 21, is formed, and a perforated ash-receptacle, 18, adapted to slide in said chamber 21, of an oven, 23, suspended at one side and below the fire-box, provided with an upper air-chamber, 30, a passage, 26, intervening the said chamber 30 and oven and the fire-box and leading into said chamber 21, series of apertures 29 in the oven-chamber 30, the combustion-flues 32 and 34, passing over the chamber 30 and around the oven, the off-take flue 36, and means for conducting the heat from the oven 23 into the chamber 30, all arranged to operate substantially in the manner and for the purpose herein set forth.

ISAAC C. SCHUYLER.

Witnesses:
GEO. W. HOLLAND,
EZRA E. METZ.